United States Patent [19]

Froess et al.

[11] 4,191,034
[45] Mar. 4, 1980

[54] BATTERY LOCK

[76] Inventors: Jacob Froess, c/o George Spector 3615 Woolworth Bldg., 233 Broadway; George Spector, 3615 Woolworth Bldg., 233 Broadway, both of New York, N.Y. 10007

[21] Appl. No.: 846,808

[22] Filed: Oct. 31, 1977

[51] Int. Cl.² .......................................... B60R 18/02
[52] U.S. Cl. ................................. 70/258; 70/56; 180/68.5
[58] Field of Search .............. 180/68.5; 70/54, 55, 70/56, 181, 202, 203, 204, 212, 230, 232, 237, 258, DIG. 43, DIG. 56; 292/148

[56] References Cited

U.S. PATENT DOCUMENTS

| | | | |
|---|---|---|---|
| 1,382,980 | 6/1921 | Hunt | 180/68.5 |
| 2,791,898 | 5/1957 | Pegg et al. | 180/68.5 X |
| 2,856,220 | 10/1958 | Easley | 292/148 |
| 2,994,395 | 8/1961 | Hall | 180/68.5 |
| 3,498,400 | 3/1970 | Hysmith | 180/68.5 |
| 3,665,739 | 5/1972 | Boll | 70/237 |
| 3,752,254 | 8/1973 | Carley et al. | 180/68.5 |
| 3,800,570 | 4/1974 | Kaplan | 70/54 X |
| 3,826,115 | 7/1974 | Davis | 180/68.5 X |
| 3,884,057 | 5/1975 | Maurer | 70/54 X |
| 3,889,500 | 6/1975 | Hix et al. | 70/232 |

FOREIGN PATENT DOCUMENTS 25058 of 1912 United Kingdom .................. 180/68.5

*Primary Examiner*—Thomas J. Holke

[57] ABSTRACT

A lock for securing an automobile storage battery from being stolen when the vehicle is left unattended, the lock consisting of a pair of vertical bars which at their lower ends are hook shaped so to anchor through a tray upon which the battery is placed, the bars being positioned adjacent opposite sides of the battery so to retain the battery therebetween, and a crossbolt extending across the top of the battery being padlocked within the upper ends of the vertical bars.

1 Claim, 3 Drawing Figures

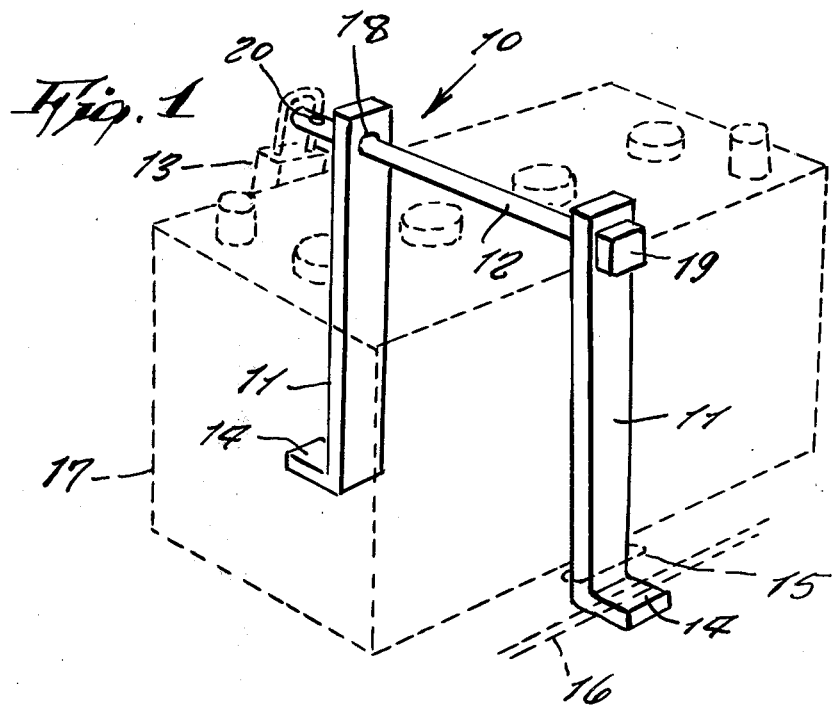
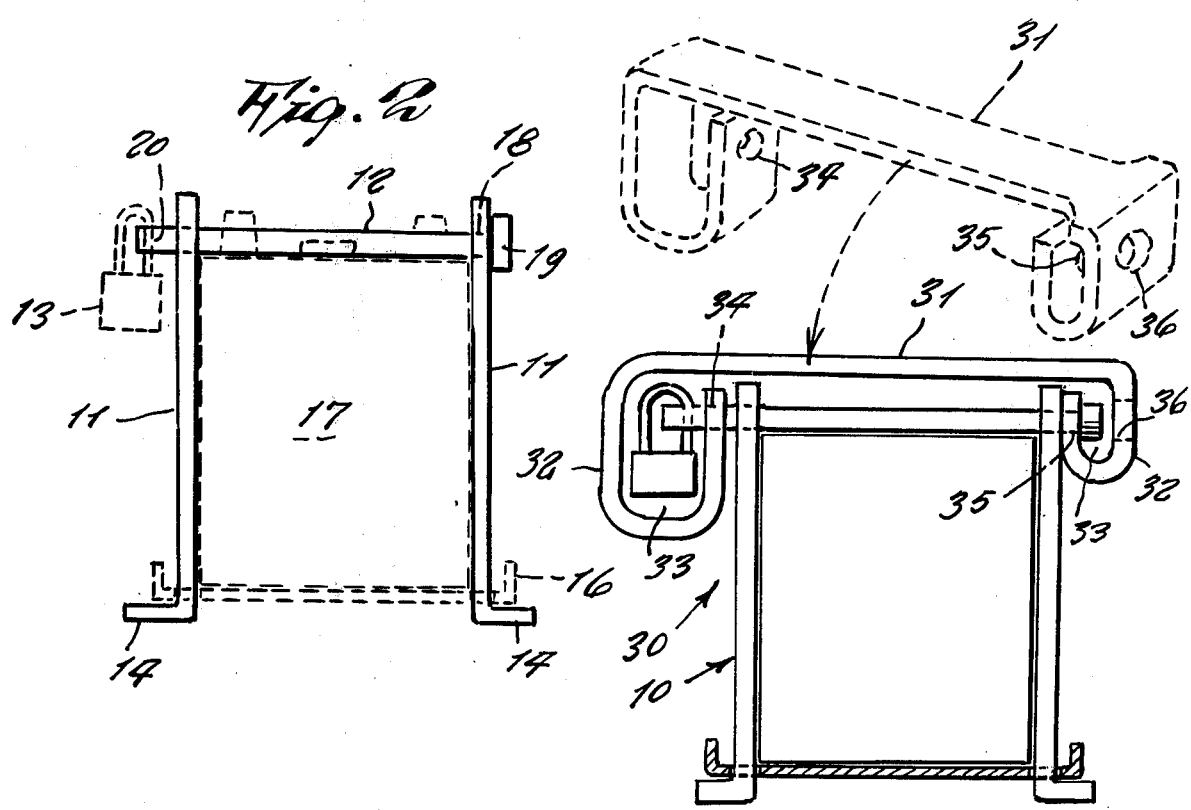

BATTERY LOCK

This invention relates generally to automotive vehicle accessories.

It is generally well known to many motorists, through actual experience, that when the vehicle is left unattended such as when parked on a street or other public place, either for only awhile or else overnight, the vehicle is subject to being ransacked by thieves. If the engine hood does not include a security lock, then various operational parts are sometimes removed. The vehicle battery, usually located in the engine compartment, is an item thieves prefer to steal. This situation is objectionable and is therefore in want of an improvement.

Accordingly, it is a principal object of the present invention to provide a battery lock that prevents unauthorized removal of a battery from a car or trunk.

Another object is to provide a battery which can be quickly and easily removed by a proper person having a key for opening the lock, so that the battery can thus be removed when needed to be replaced.

Yet another object is to provide a battery lock which does not interfere with the normal servicing of checking a battery fluid level or adding fluid thereto.

Yet a further object is to provide a battery lock which takes up a minimum space so to not interfere with other equipment of the vehicle.

Other objects are to provide a battery lock which is simple in design, inexpensive to manufacture, rugged in construction, easy to use and efficient in operation.

These and other objects will be readily evident upon a study of the following specifications and the accompanying drawing wherein:

FIG. 1 is a perspective view of the invention.

FIG. 2 is a side view thereof.

FIG. 3 is a similar view showing a modified design in which an additional cover plate is included so to completely cover the bolt in order to prevent anyone to try to saw off the bolt head or cut across any part of the bolt.

Refering now to the drawing in detail, and more particularly to FIGS. 1 and 2 thereof at this time, the reference numeral 10 represents a battery lock according to the present invention wherein there are a pair of vertical steel bars 11 and a single corssbolt 12 of steel fitted with a padlock 13.

The lower end of each bar 11 is forged with a bent over hook 14 for fitting through a slot 15 cut through a bottom of a tray 16 upon which the vehicle battery 17 is placed. The bars extend upwardly adjacent opposite sides of the battery therebetween.

An opening 18 near an upper end of each bar serves to receive the crossbolt so that the crossbolt extends across the top of the battery, and is located sufficiently close thereto so to prevent the battery to be lifted out of the tray, or slid outward from therebeneath, as shown in FIG. 2.

One end of the crossbolt has an enlarged head 19 and the other end has a transverse hole 20 receiving the padlock so that the crossbolt cannot be removed by a thief seeking to remove a battery.

However, when the battery is wished to be removed, such as when being replaced, then the padlock is removed, the crossbolt slid out and the bars will then fall sidewardly for easy removal.

In FIG. 3, a design of battery lock 30 is made additionally cover up the paddlock and the crossbolt head so to prevent a theif getting access to saw them off. This is accomplished by the battery lock 10 additionally including a cover plate 31 that cover the entire crossbolt and padlock, so that a steel saw cannot reach them. The cover plate is a wide steel strap whose width will discourage an attempt to saw across it. Each opposite end of the cover plate includes a 270 degree total bent loop 32 to form an enclosure 33 that encloses the head or padlock. Access by a key to the padlock is possible by turning the padlock up sidewardly. Openings 34, 35 and 36 along the cover plate are provided for inserting the crossbolt also therethrough, the endmost opening 36 being large enough so the bolt head can pass therethrough during installation or removal of the lock.

While various changes may be made in the detail construction, it is understood that such changes will be within the spirit and scope of the present invention as in defined by the appended claims.

What is claimed is:

1. A battery lock comprising, in combination, a pair of vertical bars positioned adjacent opposite sides of the battery, the lower ends of said bars each having a hook adapted to be fitted into a slot in a bottom of a supporting tray for the battery, each said bar further including a transverse opening near the upper end thereof, said lock also including a crossbolt having an enlarged head at one end and a hole at the other end, wherein said crossbolt is received in said transverse openings of said bars spaced from and disposed across the top of the battery with said other end of said crossbolt extending beyond one of said bars with a padlock mounted through said hole, said lock also including a removable cover plate having a straight portion covering said bars, crossbolt and padlock, said coverplate including downwardly bent terminal portions removably secured to said crossbolt, said terminal portions encompassing both ends of said crossbolt and said padlock such that said cover plate obstructs access to said cross bolt and padlock.

* * * * *